(12) United States Patent
Lan et al.

(10) Patent No.: US 10,869,029 B2
(45) Date of Patent: Dec. 15, 2020

(54) HYBRID DIGITAL-ANALOG CODING

(71) Applicant: Microsoft Technology Licensing, LLC, Redmond, WA (US)

(72) Inventors: Cuiling Lan, Beijing (CN); Chong Luo, Beijing (CN); Feng Wu, Beijing (CN); Wenjun Zeng, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 26 days.

(21) Appl. No.: 16/311,129

(22) PCT Filed: Jul. 20, 2017

(86) PCT No.: PCT/US2017/042957
§ 371 (c)(1),
(2) Date: Dec. 18, 2018

(87) PCT Pub. No.: WO2018/022391
PCT Pub. Date: Feb. 1, 2018

(65) Prior Publication Data
US 2019/0141316 A1 May 9, 2019

(30) Foreign Application Priority Data
Jul. 29, 2016 (CN) .......................... 2016 1 0618067

(51) Int. Cl.
*H04N 19/103* (2014.01)
*H04N 19/124* (2014.01)
*H04N 19/154* (2014.01)
*H04N 19/18* (2014.01)
(Continued)

(52) U.S. Cl.
CPC ......... *H04N 19/103* (2014.11); *H04N 19/124* (2014.11); *H04N 19/14* (2014.11); *H04N 19/154* (2014.11); *H04N 19/18* (2014.11); *H04N 19/192* (2014.11)

(58) Field of Classification Search
None
See application file for complete search history.

(56) References Cited

U.S. PATENT DOCUMENTS 7,253,761 B1 * 8/2007 Hoyos .................. H03M 1/121
341/143
2004/0179591 A1 * 9/2004 Wenger ............ H04N 21/23655
375/240.01

(Continued)

FOREIGN PATENT DOCUMENTS

| CN | 102394739 A | 3/2012 |
| CN | 102930545 A | 2/2013 |
| CN | 103139571 A | 6/2013 |

OTHER PUBLICATIONS

Z. Song, R. Xiong, S. Ma and W. Gao, "Hybridcast: A wireless image/video SoftCast scheme using layered representation and hybrid digital-analog modulation," 2014 IEEE International Conference on Image Processing (ICIP), Paris, 2014, pp. 6001-6005 (Year: 2014).*

(Continued)

*Primary Examiner* — Tyler W. Sullivan
(74) *Attorney, Agent, or Firm* — Schwegman Lundberg & Woessner, P.A.

(57) ABSTRACT

In accordance with implementations of the subject matter described herein, a hybrid digital-analog coding scheme is proposed. In general, in accordance with implementations of the subject matter described herein, digital or analog encoding is selected at a level of chunks of a frame rather than at a level of the whole frame. Further, the encoding of a chunk is based on an expected distortion to be caused by analog transmission of the chunk over a communication channel, the distortion being estimated based on a constraint on available transmission resources over the transmission channel.

13 Claims, 9 Drawing Sheets

(51) Int. Cl.
*H04N 19/192* (2014.01)
*H04N 19/14* (2014.01)

(56) References Cited

U.S. PATENT DOCUMENTS

| | | | |
|---|---|---|---|
| 2009/0154534 A1* | 6/2009 | Hassan | H04L 1/0019 |
| | | | 375/219 |
| 2010/0135656 A1* | 6/2010 | Khurgin | H04J 14/02 |
| | | | 398/43 |
| 2011/0032983 A1* | 2/2011 | Sezer | H04N 19/103 |
| | | | 375/240.02 |
| 2012/0314795 A1* | 12/2012 | Vilhonen | H03F 3/245 |
| | | | 375/295 |
| 2015/0029465 A1 | 1/2015 | Ishikawa et al. | |
| 2016/0217547 A1* | 7/2016 | Stach | G06T 1/005 |
| 2018/0270471 A1* | 9/2018 | Luo | H04N 19/129 |

OTHER PUBLICATIONS

L. Xiaocheng, F. Nianfei, L. Yu, C. Shuri and W. Xiaojing, "Soft wireless image/video broadcast based on component protection," 2014 4th IEEE International Conference on Network Infrastructure and Digital Content, Beijing, 2014, pp. 84-89 (Year: 2014).*

Liu, D., Cui, H., Wu, J. et al. Resource Allocation for Uncoded Multi-user Video Transmission over Wireless Networks. Mobile Netw Appl 21, 950-961 (2016) (Year: 2016).*

"First Office Action and Search Report Issued in Chinese Patent Application No. 201610618067.0", dated Jan. 6, 2020, 12 Pages.

Lan, Cuiling, et al., "A Practical Hybrid Digital-Analog Scheme for Wireless Video Transmission", In Transactions on Circuits and Systems for Video Technology, vol. 28, Issue. 7, Jul. 2018, pp. 1634-1647.

He, Dongliang, et al., "Swift: A Hybrid Digital-Analog Scheme for Low-Delay Transmission of Mobile Stereo Video", In Proceedings of the ACM International Conference on Modeling, Analysis and Simulation of Wireless and Mobile Systems, Nov. 2015, pp. 327-336.

Yu, Lei, et al., "Hybrid digital-analog scheme for video transmission over wireless", In International Symposium on Circuits and Systems, May 19-23, 2013, pp. 1163-1166.

"International Search Report and Written opinion issued in PCT Application No. PCT/US17/042957", dated Oct. 16, 2017, 12 Pages.

* cited by examiner

HYBRID DIGITAL-ANALOG CODING

CROSS-REFERENCE TO RELATED APPLICATIONS

This application is a U.S. National Stage Filing under 35 U.S.C. 371 of International Patent Application Serial No. PCT/US2017/042957, filed Jul. 20, 2017, and published as WO2018/022391 A1 on Feb. 1, 2018, which claims priority to Chinese Application No. 201610618067.0, filed on Jul. 29, 2016; which applications and publication are incorporated herein by reference in their entirety.

BACKGROUND

In the field of data coding, there are two coding schemes, the analog scheme and the digital scheme. The two coding schemes have their own advantages and disadvantages. Generally speaking, the analog coding can handle communication channel variations with graceful performance improvement or degradation, but is limited in terms of distortion performance. On the other hand, the digital coding has been widely applied in transmission systems of limited resources due to its great compressibility and fault tolerance capability. However, when coding schemes such as the modulation coding scheme and the coding rate are given, the performance of a digital coding scheme may be highly dependent on the channel quality and may have large fluctuations with variations of the channel quality. Therefore, it is desired to provide a coding scheme for an organic combination of the digital and analog coding techniques such that they compensate with each other to achieve improvement of the overall coding performance.

SUMMARY

In accordance with implementations of the subject matter described herein, a hybrid digital-analog coding scheme is proposed. In general, in accordance with implementations of the subject matter described herein, digital or analog encoding is selected at a level of chunks of a frame rather than at a level of the whole frame. Further, the encoding of a chunk is based on an expected distortion to be caused by analog transmission of the chunk over a communication channel, the distortion being estimated based on a constraint on available transmission resources over the transmission channel.

In some implementations, at the encoding side, a plurality of chunks are obtained after a transformation on a frame to be transmitted. These chunks are represented by coefficients obtained from the transformation. Then an expected distortion of the analog transmission is determined based on a transmission resource constraint of the channel and variances of coefficients in the chunks. The plurality of chunks are selectively encoded for digital or analog transmission on the channel based on the determined expected distortion. At the decoding side, the received chunks are decoded in a corresponding digital or analog decoding manner. The proposed hybrid digital-analog coding scheme may achieve a trade-off between analog transmission and digital transmission under given transmission resources and may also achieve a lower distortion for the analog transmission.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Throughout the drawings, the same or similar reference symbols refer to the same or similar elements.

DETAILED DESCRIPTION

The subject matter described herein will now be discussed with reference to several example implementations. It should be understood these implementations are discussed only for the purpose of enabling those skilled persons in the art to better understand and thus implement the subject matter described herein, rather than suggesting any limitations on the scope of the subject matter.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below.

Example Environment

Figure 1:
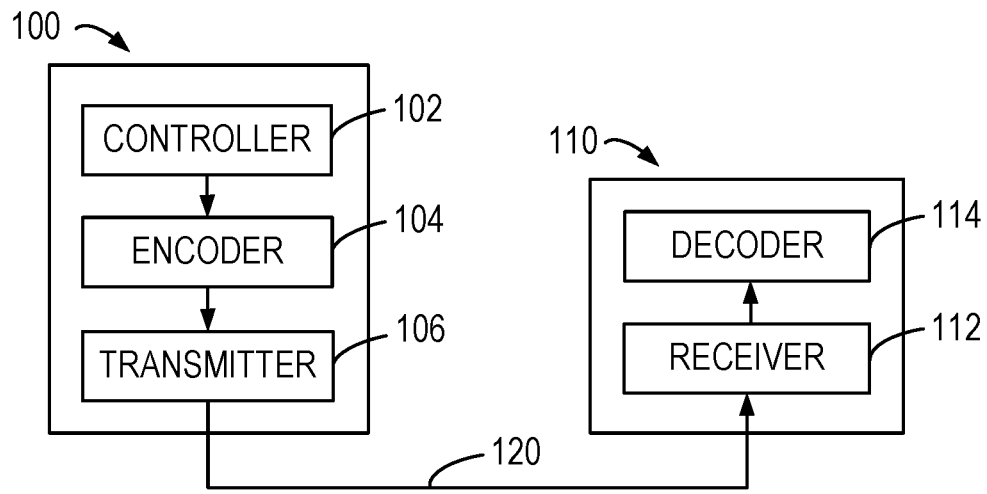
FIG. 1 illustrates a block diagram of an environment where implementations of the subject matter described herein can be implemented.

FIG. 1 illustrates a block diagram of an environment where implementations of the subject matter described herein can be implemented. As shown, the environment includes a transmitting device 100 and a receiving device 110. The transmitting device 100 at least includes a controller 102, an encoder 104, and a transmitter 106. The controller 102 may process data or signals to be transmitted by the transmitting device 100, such processing including for example framing operation, time-frequency transformation, and the like. The data to be transmitted may include videos, audios, images, and various other forms of signals such as sensor data. The controller 102 provides the processed data to the encoder 104. The encoder 104 encodes the data. The encoded data may be transmitted by one or more transmitters 106 to the receiving device 110 via a wireless and/or wired communication channel 120.

The receiving device 110 at least includes one or more receivers 112 which receive signals and provide the received signals to one or more decoders 114. The decoder 114 generally performs inverse operations to the encoder 104 so as to decode the data.

It would be appreciated that although shown as separate components, the controller 102 and the encoder 104 may be integrated into a same component. The controller 102, the encoder 104, or the decoder 114 may be implemented by for example a central processing unit (CPU), a general processor, a dedicated processor, one or more microprocessors, a microcontroller, a digital signal processor, a baseband processor integrated circuit, an application-specific integrated circuit, a graphic processor, and any combination thereof.

As briefly described above, the digital coding scheme and the analog coding scheme have their own advantages and disadvantages. It has been proposed to attempt to combine the two schemes to obtain a hybrid scheme. In the hybrid scheme, a portion of data to be transmitted may be encoded digitally while the other portion of data is encoded in an analog manner. Such hybrid scheme may allow a higher bit capacity in terms of digital encoding and may achieve graceful performance transition with respect to channel variations in terms of analog encoding at the same time.

Known hybrid encoding methods generally choose the digital encoding or analog encoding in units of frames. In some other hybrid encoding methods, wavelet transformation is applied on the data such as video segments to be transmitted, and the transformation coefficients are divided on the basis of frequency. The coefficients in high frequency bands are encoded and transmitted in an analog manner while the coefficients in low frequency bands are encoded and transmitted in a digital manner.

However, in these known hybrid encoding schemes, the constraint on resources for the digital and analog transmissions is not taken into account for optimization. The inventors have noticed that the transmission resources may have a great influence on the transmission distortion, especially on the distortion of the analog transmission. If it is impossible to reasonably allocate transmission resources among the two types of transmissions, introducing the analog encoding into the hybrid scheme may bring a larger distortion compared with the traditional solution based on the complete digital encoding, which is undesirable.

In order to at least partially address the above problems and other potential problems, a new hybrid digital-analog coding scheme is proposed herein. As briefly introduced above, in accordance with implementations of the subject matter described herein, selective encodings and transmissions are applied on the basis of chunks in a frame rather than the whole frame. In other words, each frame may be divided into a plurality of chunks. By trading off a resource consumption of the digital transmission against a resource consumption of the analog transmission under a transmission resource constraint of the channel, the chunks in the frame are encoded and transmitted respectively in a digital or analog manner. This may significantly reduce an expected distortion of the analog transmission. In addition, variances of coefficients in the respective chunks are also taken into account in the selective encoding, thereby further reducing the distortion.

More specifically, implementation of the subject matter described herein works based on the following founding of the inventors: the distortion of the analog transmission is associated with the transmission resource constraint and the variances of coefficients in the chunks. As used herein, the transmission resource may include the transmission bandwidth and/or transmission energy. Some theoretical analysis and supports of this founding will be first provided hereinafter.

Overview of the Principle

In digital encoding, generally encoding operations are performed on chunks based on preset encoding and modulation parameters. The setting of the parameters may in turn affect the transmission resource to be consumed by the encoded chunks. Specifically, the digital encoding process may be divided into three main stages of quantizing, encoding, and modulating. An average transmission resource for a given chunk is mainly dependent on a quantization step used in the quantizing stage and a data transmission rate based on the coding and modulation scheme. Besides, if a variance of coefficients in the chunk is relatively great, correspondingly, a large bit number may be consumed by each of the coefficients when being encoded into bit values, which may further increase the resource of the digital transmission.

As an example for illustration, a digital encoding scheme is provided where entropy encoding is applied on a chunk (denoted as "$S_i$"). The bit number to be consumed by each of the coefficients in the chunk after being quantized with a quantization step (denoted as "$Q_i$") may be equal to or approximate to an entropy of the quantized chunk (denoted as "$\check{S}_i$") which may be represented as:

$$b_i = H(\check{S}_i) = \tfrac{1}{2} \log_2(2\pi e \sigma_i^2) - \log_2(Q_i) \tag{1}$$

where $\sigma^2$ represents a variance of coefficients in the chunk $S_i$. Here, each chunk is modeled as a Gaussian source with a mean value of zero. The variance of coefficients in the chunk is indicated by the variance $\sigma^2$ or the standard deviation $\sigma$ of the Gaussian source.

If the chunk $S_i$ has L coefficients, then an average bandwidth (denoted as "$c_i$") to be consumed by the chunk after the digital encoding may be a ratio of the total bit number $L*b_i$ (in units of bits) after encoding to a digital transmission rate (denoted as "r" in units of bits/symbol). For example, the average bandwidth $c_i$ may be calculated as $c_i = L*b_i/r$ (in units of symbols). Therefore, it is supposed that K chunks are to be transmitted digitally, the total bandwidth (denoted as "$B_d$") to be consumed is:

$$B_d = \sum_{i=1}^{K} c_i = L\sum_{i=1}^{K} b_i/r \tag{2}$$

It can be seen from Equations (1) and (2) that the bandwidth $B_d$ of the digital transmission is associated with parameters of the digital encoding such as the quantization step and the digital transmission rate. In addition, the bandwidth $B_d$ of the digital transmission is also associated with the number of chunks to be encoded and the variances of the chunks.

In contrast to the digital encoding, coding parameters are not directly set upon analog encoding but are determined by an available transmission resource. Specifically, the available transmission resource may be allocated among chunks to be transmitted and limit a scaling factor for each chunk. The scaling factor is used to scale coefficients of the chunk and the scaled coefficients are then modulated in an analog manner for transmission. Upon analog transmission, if the coefficients of a chunk are scaled with a large scaling factor, the chunk may be less affected by distortion factors such as channel noise.

An analog encoding scheme that has been proven to provide good performance is that, given the available transmission resource, a large scaling factor is allocated to a chunk with a smaller coefficient variance. For example, the scaling factor (denoted as "$g_i$") may be determined based on the available transmission resource and the coefficient variance as follows:

$$g_i = \sqrt{\frac{MP_a}{\sigma'_i \sum_{j=1}^{M} \sigma'_j}} \quad (3)$$

where M represents the number of chunks for analog transmission, $P_a$ represents an average per-symbol transmission energy, $\sigma'_i$ represents a standard deviation of coefficients in the $i^{th}$ chunk (denoted as "$X_i$"), which indicates a variance of coefficients in the chunk, and $\sigma'_j$ represents a variance corresponding to the $j^{th}$ chunk in a similar way. In Equation (3), the average energy $P_a$ for the analog transmission is generally dependent on an available transmission energy (denoted as "$E_a$") and available transmission bandwidth (denoted as "$B_a$") for the analog transmission. For example, in a scheme where each modulated symbol may carry two coefficients, the average energy $P_a$ may be calculated as $P_a = E_a/2B_a$.

Applying the analog encoding on the chunks using different encoding parameters may result in different analog transmission distortions. Generally speaking, the distortion is introduced because there are deviations between the received chunks and the transmitted chunks caused by the noise on the channel. Measurement of the distortion will be described below.

First, in the analog encoding, a coefficient $x_{ij}$ within a chunk $X_i$ (where $j=1, 2, \ldots, L$, and L representing the number of coefficients included in the chunk) is scaled by a scaling factor $g_i$ to obtain the scaled coefficient $y_{ij}=g_i x_{ij}$. The scaled coefficient is transmitted after modulation. Due to the introduction of the channel noise, the received coefficient is represented as $\hat{y}_{ij} = y_{ij} + z$, wherein z represents a channel noise. In some cases, the channel noise may be modeled as an Additive White Gaussian Noise (AWGN), which may be denoted as $Z \sim \mathcal{N}(0, N_0)$, where $N_0$ represents a variance or square variance of the channel noise. A signal-to-noise ratio (SNR) of the channel may be computed as $SNR=2P_a/2N_0$ according to its general definition. It would be appreciated that the channel noise may be determined as other types of noise of based on prior knowledge or experience.

In decoding, the corresponding scaling factor g is also utilized to decode the coefficient $\hat{y}_{ij}$ so as to obtain the decoded coefficient (denoted as "$\hat{x}_{ij}$"):

$$\hat{x}_{ij} = \frac{\hat{y}_{ij}}{g_i} = x_{ij} + \frac{z}{g_i} \quad (4)$$

The chunk obtain after decoding all the L coefficients may be represented as $\hat{X}_i$. The distortion of the analog transmission for each chunk (denoted as "$d_{ai}$") may be determined as a difference between the original chunk $X_i$ and the received chunk $\hat{X}_i$. In an example, this difference may be represented as a mean square error (MSE) between the original chunk $X_i$ and the receiving chunk $\hat{X}_i$ as follows:

$$d_{ai} = \mathbb{E}\left((\hat{X}_i - X_i)^2\right) = \frac{\mathbb{E}(z^2)}{g_i^2} = \frac{N_0}{g_i^2} = \frac{N_0}{P_a} \frac{\sigma'_i}{M} \sum_{j=1}^{M} \sigma'_j \quad (5)$$

When M chunks are used for analog transmission, the total distortion of the analog transmission (denoted as "$D_{analog}(X)$") may be a sum of distortions of the M chunks, which may be represented as:

$$D_{analog}(X) = \sum_{i=1}^{M} d_{ai} = \sum_{i=1}^{M} \frac{N_0}{g_i^2} = \frac{N_0}{P_a M} \left(\sum_{i=1}^{M} \sigma'_i\right)^2 \quad (6)$$

In Equations (5) and (6), $N_0/P_a$ indicates that the distortion is associated with the channel quality (for example, the SNR). Besides, it can be seen that the distortion is also positively correlated with the variance (for example, the standard deviation $\sigma'_i$) of the coefficients in the chunk. In other words, when the chunks for analog encoding and transmission are given, the greater the variances of the chunks are, the greater the distortion of the chunks is. It can also be seen that since the transmission resource of analog transmission is to be allocated among the M chunks to be transmitted, if the available resource is less (the $P_a$ is small), then the corresponding distortion may be greater.

Based on the analysis above, during a hybrid digital-analog coding and transmission scheme, the chunks selected for digital transmission may decide the transmission resource to be consumed by the digital transmission. At the same time, under the restriction of transmission resource, the resource occupied by the digital transmission may decide the transmission resource available for the analog transmission. Further, given the channel quality (for example, the SNR), the available transmission resource and the chunks remained for the analog transmission jointly determine the distortion of the analog transmission. In view of this, in implementations of the subject matter described herein, it is desired to jointly consider a transmission resource constraint and variances of coefficients in chunks to selectively encode the chunks, so as to obtain a reduced analog transmission distortion.

It has been proved in theory the correlation of the distortion of analog transmission with the transmission resource constraint and the variances of the coefficients in the chunks above in brief. More detailed analysis and demonstration may refer to the following publication by the inventors: Cuiling Lan, Chong Luo, Feng Wu, Wenjun Zeng, entitled "A Practical Hybrid Digital-Analog Scheme for Wireless Video Transmission", *IEEE TRANSACTIONS ON CIRCUITS AND SYSTEMS FOR VIDEO TECHNOLOGY*, Volume. 28, Issue. 7, July 2018, pp. 1634-1647, which is incorporated by reference herein in its entirety.

Example Implementations of the Encoding Process

Figure 2:
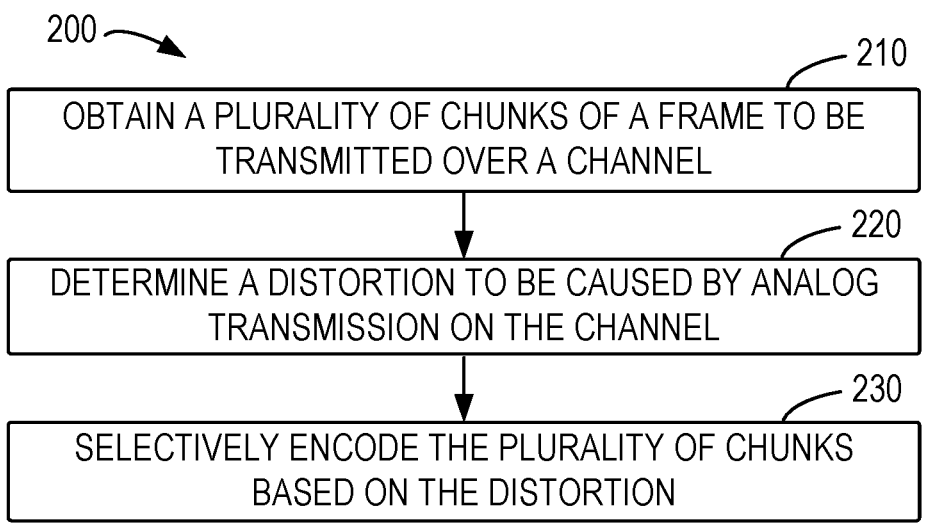
FIG. 2 illustrates a flowchart of an encoding process in accordance with an implementation of the subject matter described herein.

Various example implementations of the subject matter described herein will be described in detail below with reference to the accompanying drawings. Reference is made to FIG. 2 which shows a high-level flowchart of an encoding process 200 in accordance with an example implementation of the subject matter described herein. The encoding process 200 illustrates in general a core idea of an encoding process for data to be processed in the controller 102 and the encoder 104 of the transmitting device 100. In the context of the subject matter described herein, the data to be processed are framed for the convenience of processing. Examples of the data to be processed include, but are not limited to, video, audio, animation images, sensor signals, and the like. It should be noted that the process shown in FIG. 2 is a process for processing a frame in the data to be processed. By applying the encoding process 200 onto a plurality of frames in the data, part or all of the data may be encoded.

The encoding process 200 starts at 210 where a plurality of chunks of a given frame to be transmitted over a channel are obtained. In some example implementations, a specific transformation may be applied on the frame currently being processed so as to de-correlate the data contained in the frame, thereby partitioning the frame into the chunks. Examples of such transformation include, but are not limited to, discrete cosine transformation (DCT). For example, a three-dimensional discrete cosine transformation (3D-DCT) may be applied to a video frame, where one of the dimensions is the time dimension. For an image frame, a two-dimensional discrete cosine transformation (2D-DCT) may be applied.

Figure 3:
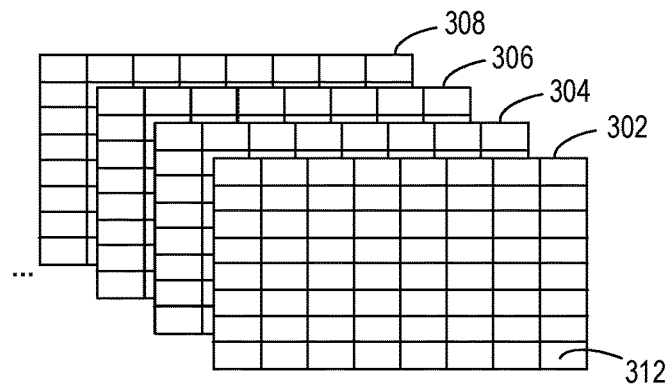
FIG. 3 illustrates an example of chunks of a frame in accordance with an implementation of the subject matter described herein.

In the example implementations above, each chunk may be indicated by corresponding transformation coefficients. For example, the transformation coefficients may be ranked and grouped based on frequencies to obtain a plurality of chunks, where each of the chunks may include a plurality of coefficients. FIG. 3 depicts an example of chunks of a frame in accordance with an implementation of the subject matter described herein. As shown, a transformation may be applied on a frame 302 and then the transformation coefficients are divided into a plurality of chunks 312 based on frequencies. As an example, the chunks at the higher-left corner may be corresponding to lower frequencies while the chunks at the lower-right corner may be corresponding to higher frequencies. Likewise, a similar partitioning process may be applied to other frames 304, 306, and 308 in the data to be processed.

It should be understood that it is merely an example to obtain chunks by applying transformation to the frame and represent the chunks as transformation coefficients, which is not intended to limit the scope of the subject matter described herein. In other implementations, any appropriate techniques, either known currently or to be developed in the future, may be employed to partition a frame into chunks.

At 220, a distortion to be caused by analog transmission on the channel 120 between the transmitting device 100 and the receiving device 110 is determined. It is to be noted that the distortion determined here is a distortion that will be introduced in an assumption that analog transmission is occurred on the channel 120, which therefore may be referred to as an "expected distortion." According to implementations of the subject matter described herein, as analyzed above, the expected distortion may be determined based on the following factors: (1) a transmission resource constraint of the channel 120 and (2) a variance of coefficients in each of the chunks. Based on the two factors, it is expected to find a reasonable partitioning between analog transmission and digital transmission of the chunks so as to maintain the expected distortion of analog transmission at a low level.

At 230, the plurality of chunks are selectively encoded based on the expected distortion determined at 220. Implementations of the subject matter described herein are based on the hybrid analog and digital encoding. Therefore, digital encoding or analog encoding may be selected for each chunk. Correspondingly, a chunk encoded digitally may be used for digital transmission while a chunk for analog encoding may be used for analog transmission. In some example implementations, by attempting to select one or more chunks for digital transmission and then determining whether the expected distortion of analog transmission based on the remaining chunks is decreased, it can be determined iteratively which chunks among the plurality of chunks to be transmitted are to be encoded in a digital manner and which are to be encoded in an analog manner.

Figure 4:
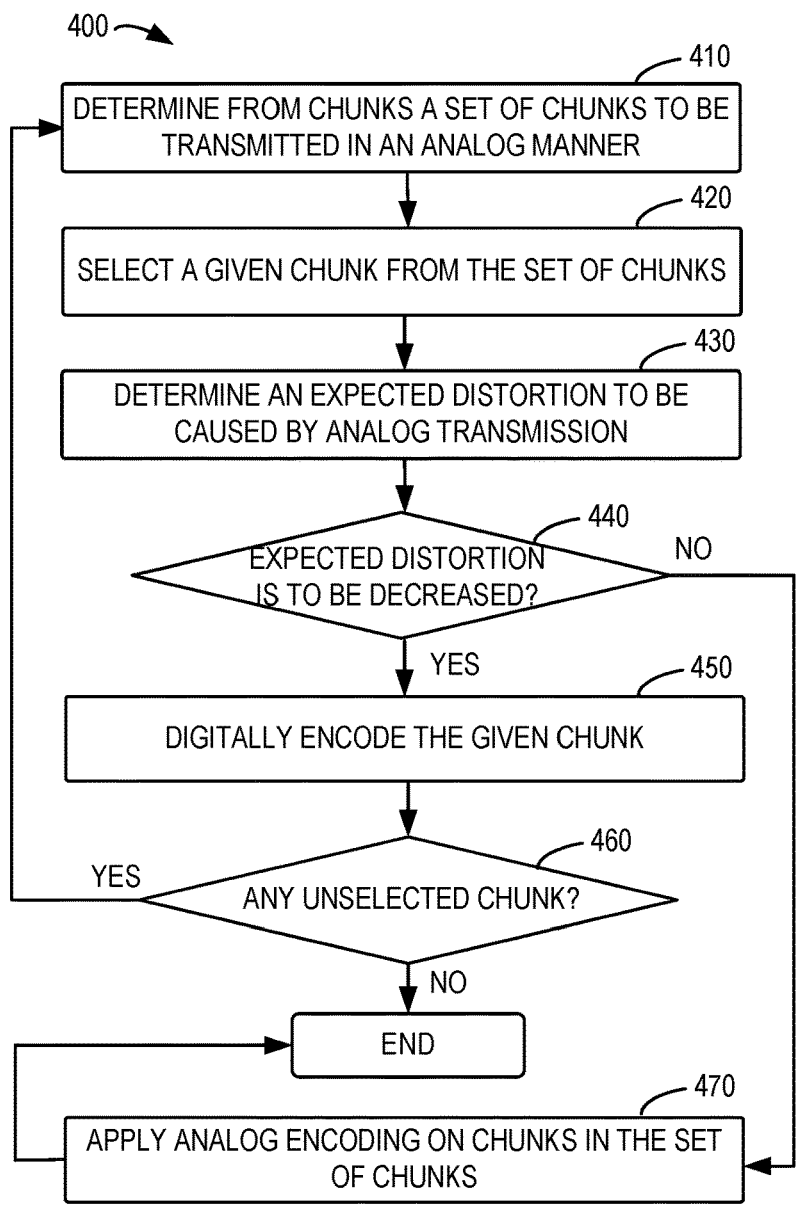
FIG. 4 illustrates a flowchart of an example encoding process in accordance with an implementation of the subject matter described herein.

Reference is now made to FIG. 4 to describe the determination of the selective encoding of the chunks based on the expected distortion of analog transmission. Specifically, FIG. 4 shows a flowchart of an example encoding process 400 in accordance with an implementation of the subject matter described herein. The encoding process 400 may be considered as a detailed example implementation of the encoding process 200 and may also be performed by the controller 102 and the encoder 104 of the transmitting device 100.

At 410, a set of chunks for analog transmission are determined from the plurality of chunks. It is supposed that the frame to be transmitted is divided into N chunks represented as $S_1$, $S_2$, $S_N$, respectively, where N is an integer greater than 1. Initially, the set of chunks at 410 include all the N chunks of the frame to be transmitted. At 420, a given chunk is selected from the set of chunks, and then at 430, an expected distortion to be caused by analog transmission is determined if the given chunk is digitally encoded.

It can be understood from the above discussion about the distortion of analog transmission that, in analog encoding, a chunk with a larger degree of variance may be assigned with a smaller scaling factor, which may then cause a high distortion of the chunk (for example, referring to Equations (3), (5), and (6)). In this case, applying digital encoding on such chunk may be more beneficial to the distortion reduction. In some example implementations, based on the variances of the coefficients in the chunks, a chunk with a larger degree of variance may be selected from the set of chunks as the given chunk such that chunks with smaller degrees of variance may be retained for analog encoding and transmission for the purpose of distortion reduction. As an example, the chunks may be ranked based on the variances of coefficients in the chunks, and then a chunk with a larger (or largest) degree of variance may be selected from the ranked chunks.

After the selection at 420, the analog transmission may be based on the unselected chunks in the set of chunks, while the digital transmission may be based on all the selected chunk(s). For example, if $S_1$ is selected at the first time for digital encoding and transmission, the remaining N−1 chunks $S_2$ to $S_N$ may be used for analog transmission. Then the expected distortion of the analog transmission may be determined in view of such partitioning between the analog transmission and the digital transmission.

During operation, in order to determine the distortion, a transmission resource to be consumed by the digital transmission is first estimated, and then an available transmission resource for the analog transmission under the transmission resource constraint of the channel is determined. In an example implementation of the transmission resource consumed by the digital transmission, if the digital encoding parameters (for example, the quantization step and data transmission rate) have been set, the transmission resource consumed by the digital transmission may be determined based at least on the variance of the given chunk (for example, the chunk $S_1$). The determination of the digital transmission bandwidth may refer to Equations (1) and (2). In this case, the number of chunks for digital transmission is K=1. It should be noted that as the iterations of the process 400, the value of K may also be incremented accordingly. After the transmission resource occupied by the digital transmission is removed from the transmission resource constraint, the remaining transmission resource may be available for the analog transmission.

Further, based on the available transmission resource for the analog transmission, the expected distortion generated when remaining chunks (for example, the chunks $S_2$ to $S_N$) in the set of chunks are used for the analog transmission may be determined. The variances of the coefficients in the chunks $S_2$-$S_N$ may also be considered in determining the expected distortion. The expected distortion may be determined based on for example Equations (5) and (6).

Still referring to FIG. 4, after determining the expected distortion of the analog transmission, at 440, it is determined whether the current expected distortion is decreased. Initially, the expected distortion may be set as a larger value. After the given chunk $S_1$ in the initial set of N chunks is selected for digital encoding, the current expected distortion is determined and compared with the previous expected distortion (for example, the preset one in this case). If the expected distortion is decreased, it means that selecting the current given chunk for digital encoding may help reduce the distortion of analog transmission. Therefore, at 450, the given chunk is digitally encoded.

At 460, it is determined whether there is any unselected chunk in the set of chunks. If there is a chunk(s) unselected, the process 400 returns to 410 to determine a further set of chunks for analog transmission. The chunk(s) that was determined previously as to be encoded digitally (or that has been encoded digitally) may not be counted into the set of chunks. For example, after the first selected chunk $S_1$ is determined for digital encoding, the remaining N−1 chunks are re-grouped into a set of chunks available for analog transmission. Then, the process 400 proceeds to the subsequent steps to continue determining whether any chunks in that set can be selected for digital encoding.

As mentioned above, each time the chunk(s) that has a larger (or maximum) variance(s) may be selected from the set of chunks to make the decision because this may reduce the expected distortion of analog transmission at a fast speed.

If it is determined at 440 that the expected distortion is not decreased (compared with the previous expected distortion), for example, the expected distortion remain unchanged or is increased, it means that continuing to select chunks for digital encoding may not further reduce the expected distortion of analog transmission. Therefore, at 470, analog encoding is applied on the chunks in the set and the process 400 may end.

It can be understood if the expected distortion is not determined as lower than the preset large value for the first time during the process 400, all of the current N chunks included in the set of chunks may be encoded in an analog manner. In other words, if the transmission resource is sufficient and the distortion is tolerable, a complete analog encoding may be applied. In addition, if it is determined at 460 that the set of chunks has no chunk unselected, the process 400 may end. In this case, all the N chunks are digitally encoded at 450.

Although it is described above that one given chunk is selected each time at 420, in some other example implementations, two or more given chunks may be selected each time at 420. In these example implementations, the expected distortion of the analog transmission may be determined based on the remaining chunk(s) in the set of chunks in a similar manner.

For purpose of illustration, it is shown in the process 400 that the selected given chunk(s) is digitally encoded after determining that they can be used for the digital encoding and then the selection of the remaining chunks is continued. In some other example implementations, one or more chunks may be first determined as to be encoded digitally by the process 400 and then are subject to the digital encoding. In these examples, the step of 450 is not required in each iteration round of the process 400.

In the example implementations described above, each chunk may be only determined as to be encoded in a digital manner or an analog manner. In these example implementations, for a chunk that is encoded digitally, usually only a primary component of the chunk (which may also be referred to a primary chunk) obtained after quantization is transmitted while the part of residual component (which may also be referred to a residual chunk) is discarded. In some other example implementations, the residual component of the quantized chunk may be encoded and transmitted in an analog manner.

To understand primary and residual components of a chunk, the quantizing stage of the digital encoding is first described. Quantizing a chunk is to reduce the bit number to be consumed by each coefficient during encoding. It is supposed that scalar quantization is applied on each coefficient in a chunk $S_i$ to be digitally encoded using a quantization step (denoted as "$Q_i$"). In one example, a primary component of the chunk $S_i$ may be determined as follows:

$$\check{S}_i = \text{sign}(S_i) \times \left\lfloor \frac{S_i}{Q_i} + \frac{1}{2} \right\rfloor \quad (7)$$

where $\check{S}_i$ represents the primary component of the chunk $S_i$ and includes coefficients obtained by quantizing the respective coefficients of the chunk $S_i$, sign(·) represents a sign function, and $\lfloor \cdot \rfloor$ represents an operation of rounding down to the nearest integer. The sign function is a function of determining a positive or negative sign for each coefficient of the chunk $S_i$. For example, if a coefficient is greater than 0, the value of the sign function is +1; if the coefficient is equal to 0, the value of the sign function is 0; and if the value of the coefficient is less than 0, the value of the sign function is −1. It should be understood that other quantizing methods, either known currently or to be developed in the future, may be employed to quantize the chunk. For example, it is also possible to round up the nearest integer when quantizing.

A residual component (denoted as "$c_i X_i$") of the chunk $S_i$ may be obtained by the chunk $S_i$ minus a component (denoted as "$\tilde{S}_i$") derived from the inverse quantization of the quantized chunk (that is, the primary component) using the quantization step, which may be represented as follows:

$$\tilde{S}_i = \check{S}_i \times Q_i \quad (8)$$

$$X_i = S_i - \tilde{S}_i \quad (9)$$

Generally speaking, if the transmission of the residual component $X_i$ is not taken into account, after the primary component $\check{S}_i$ of the chunk is determined during the digital encoding, subsequent encoding and modulating operations may be performed on the primary component $\check{S}_i$ without determining and processing the residual component $X_i$. However, since the residual component $X_i$ of the chunk also carries partial information representing the chunk, a certain degree of information may be lost if the residual component $X_i$ is simply discarded, which is undesirable. Therefore, in some example implementations, the residual components of some or all of the chunks to be digitally encoded may be transmitted in an analog manner.

The residual component $X_i$ obtained after the quantization may be regarded as a new different chunk and the coefficients included therein may also have a corresponding variance. Thus, a residual chunk may be considered as a normal chunk in analog transmission. In some example implementations, the variance of the coefficients in a residual component may be determined based on the quantization step. Generally, the longer the quantization step is, the larger the variance of the residual component is. In an example, the variance of the residual component may be estimated as $\sigma'^2_i = Q_i^2/12$.

Due to the introduction of the residual components, the chunks for analog transmission among the N chunks to be transmitted may include the determined chunks and the residual components for analog transmission. If all the residual components of the chunks that are to be digitally encoded are determined for analog transmission, the total number of the chunks for the analog transmission is N. In this case, the number of the residual components to be transmitted and the variances of the coefficients for the residual components may also have influence on the distortion of analog transmission as other chunks.

In the case that the resource available for the analog transmission is sufficient, all of the desired chunks may be transmitted. However, in some other example implementations, the introduction of the residual components may further increase the number of chunks for analog transmission such that some of the chunks may be discarded. The discarding of the chunks may also introduce a distortion of analog transmission. For example, it is supposed that the chunk $S_i$ is to be discarded and its variance is $\sigma_i^2$. The signal of this chunk received at the receiving end is zero, which will generate the following distortion (denoted as "$d_{ti}$"):

$$d_{ti} = \mathbb{E}((S_i - 0)^2) = \sigma_i^2 \qquad (10)$$

It can be seen from Equation (10) that the distortion caused by each discarded chunk is positively correlated with the variance $\sigma_i^2$ of the coefficients in the chunk.

In some example implementations, the number of chunks to be discarded (denoted as "T") may be determined based on the transmission resource (for example, the transmission bandwidth $B_d$) to be consumed by digital transmission. In one example, the chunks to be discarded may be determined as $T = 2B_d/L$ (where L is the number of coefficients in a chunk). The total distortion to be caused by all of the discarded chunks may be a total of the distortions $d_{ti}$ caused by the respective T chunks.

Therefore, by considering the analog transmission of the residual components and the discarding of the chunks, the total distortion (re-denoted as "$D_{hyb}(K)$") of the analog transmission may be re-determined as a sum of the distortion to be caused by discarding of the chunks and the distortion to be caused by transmission on the channel, which may be represented as follows:

$$D_{hyb}(K) = \frac{N_0}{P_a M}\left(\sum_{i=1}^{K}\sigma'_i + \sum_{i=K+1}^{M}\sigma_i\right)^2 + \sum_{i=M+1}^{N}\sigma_i^2 \qquad (11)$$

where $$\sum_{i=M+1}^{N}\sigma_i^2$$

represents the distortion to be caused by discarding T chunks (where T=N−M) and $$\frac{N_0}{P_a M}\left(\sum_{i=1}^{K}\sigma'_i + \sum_{i=K+1}^{M}\sigma_i\right)^2$$

represents the distortion to be caused by the noised on the channel. The chunks for analog transmission include K residual components (with variances of $\sigma'_i$) of the chunks to be digitally encoded and (M−K) chunks determined for analog transmission. In Equation (11), it is supposed that none of the residual components of the K chunks for digital encoding is discarded, and all of them are available for analog transmission while (N−M) chunks (with variances of $\sigma_i^2$) among the N chunks to be transmitted are discarded.

In the example implementations where the discarding of chunks is considered, after a given chunk is selected at 420 of the process 400, the number of chunks to be discarded currently is determined based on the transmission resource to be consumed by the digital transmission of that chunk. Then the determined number of chunks are discarded from the set of chunks. As discussed above, the resource that is to be consumed by digital transmission of each chunk such as the transmission bandwidth may be determined as $c_i = L*b_i/r$. Based on the transmission resource to be occupied by digital transmission of the chunk, the number of chunks to be discarded from the analog transmission may be determined as $t_i = 2c_i/L = 2b_i/r$. It is supposed that K chunks are selected in total for digital transmission after the end of the process 400. The total number T of the discarded chunks may be the sum of the numbers of chunks to be discarded for the corresponding K chunks, namely, $T = \Sigma_{i=1}^{K} t_i = \Sigma_{i=1}^{K} 2b_i/r = 2B_d/L$.

Since the distortion to be caused by the discarded chunks is positively correlated with the variances for the chunks by referring to Equation (10), in some example implementations, chunks or components with smaller variances among the chunks for analog transmission (including the chunks in the set and the residual components for analog encoding) may be discarded so as to avoid overly increasing the distortion. For example, the chunks to be discarded for each time may be the $t_i$ chunks with the least variances among the chunks for analog transmission. Generally, if chunks with larger variances are selected for digital transmission as desired in the example implementations above, then the variances of the residual components derived after the quantization of those chunks may usually be greater than the chunks that are not selected for digital encoding. Therefore, when the chunks are discarded based on the variances, the chunks with smaller variances may be discarded while the residual components may be maintained.

In some example implementations, after the chunks to be discarded are determined, the distortion introduced by the discarding of the chunks may be considered when determining the expected distortion at 430. Meanwhile, if the residual components are also suitable for transmission at this time, the expected distortion may be determined according to the above Equation (11).

Figure 5A:
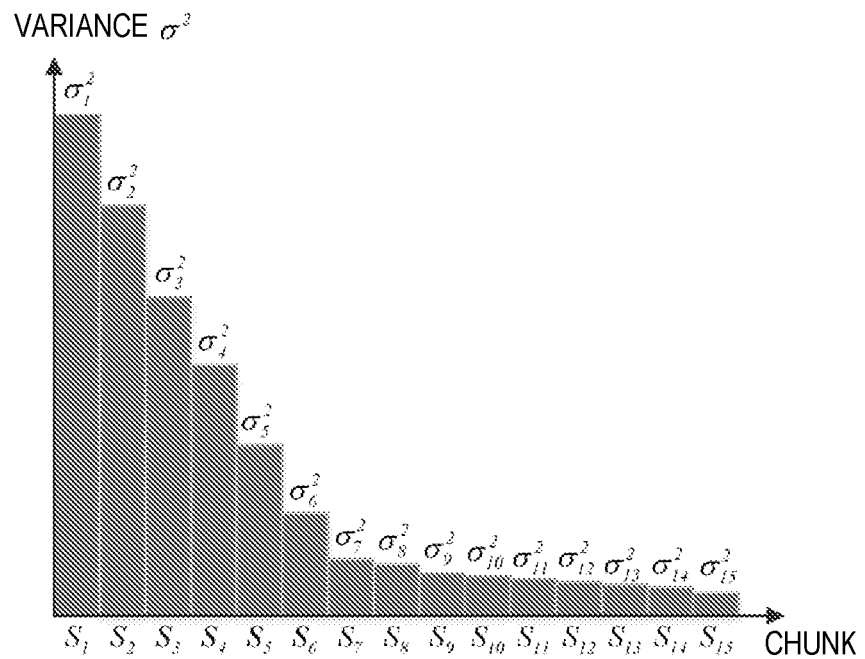
FIGS. 5A-5C illustrate an example process of determining encoding schemes for chunks in accordance with an implementation of the subject matter described herein.
Figure 5B:
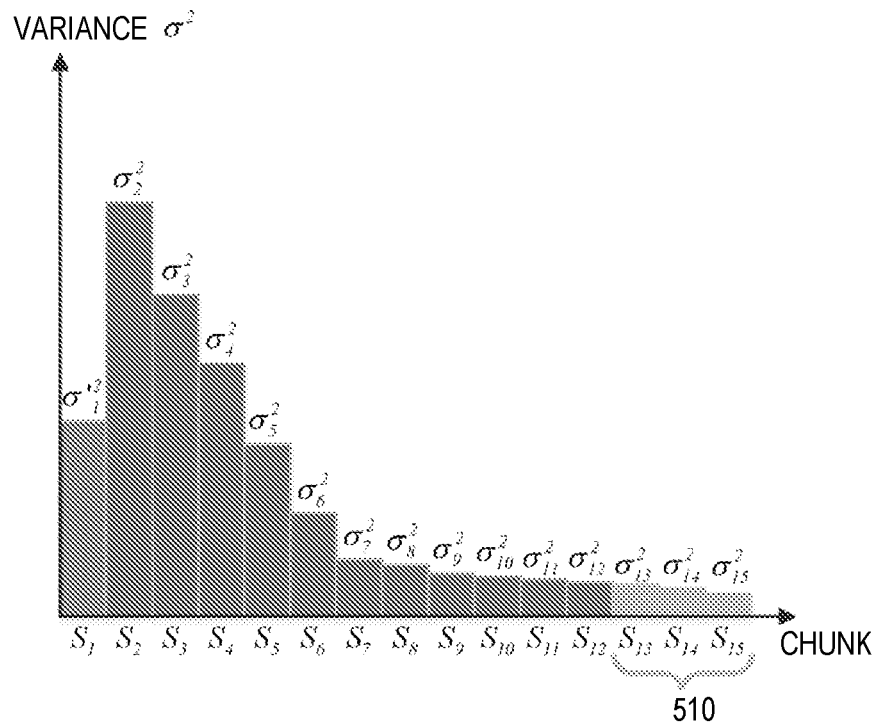
Figure 5C:
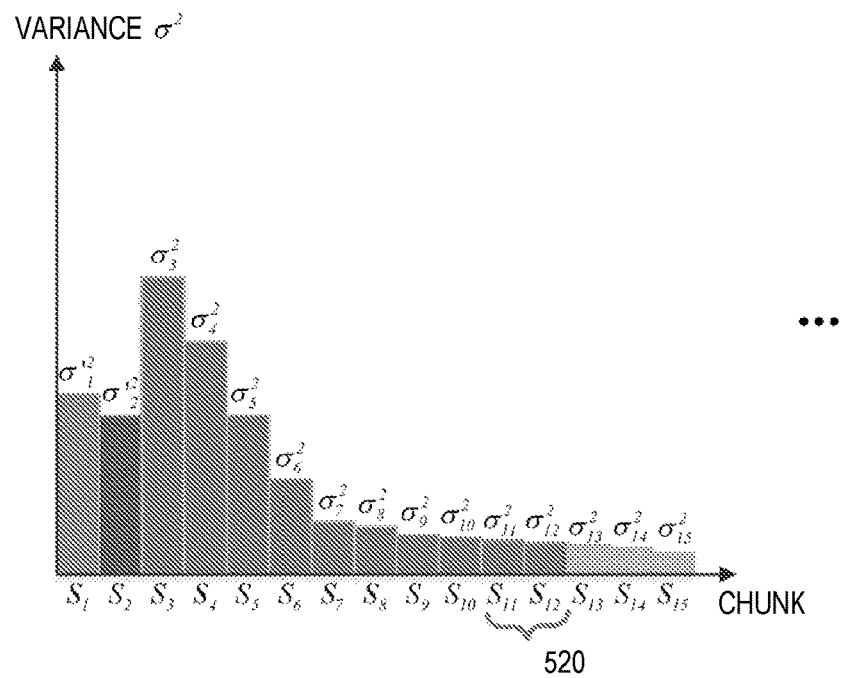

FIGS. 5A-5C illustrate an example process of determining encoding schemes for chunks. In this process, a residual component of a chunk to be digitally encoded may be used for analog encoding and some of the chunks for analog transmission will be discarded. In the example shown, it is supposed that 15 chunks of a frame, $S_1$ to $S_{15}$, are to be transmitted and have variances of their coefficients from $\sigma_1^2$ to $\sigma_2^2$. It should be understood that these numbers are only given as examples and more or less chunks may be transmitted in other examples.

In FIG. 5A, chunks $S_1$-$S_{15}$ are ranked in a descending order according to their variances so as to facilitate the selection of the chunks. Initially, it is attempted to select the chunk $S_1$ with the highest variance. Then, it is determined whether the expected distortion of analog transmission based on the remaining chunks $S_2$ to $S_{15}$ will be decreased. In some examples, the analog transmission may also be based on the residual component (the variance of which is $\sigma'^2_i$) obtained after quantizing the chunk $S_1$. If it is determined that the current expected distortion of analog transmission is increased, the chunk $S_1$ may be encoded digitally as illustrated in FIG. 5B.

Due to the occupation of transmission resource by digital transmission after the chunk $S_1$ is encoded digitally, some chunks (for example, 3) may be discarded from the chunks for analog transmission. In the example of FIG. 5B, the three chunks are determined as to be discarded from the chunks $S_2$ to $S_{15}$ and the residual component of the chunk $S_1$ that are currently available for analog transmission. As shown, the three chunks $S_{13}$ to $S_{15}$ in the set of chunks 510 with the smallest variances are discarded. At this point, the chunks $S_2$ to $S_{12}$ and the residual component of the chunk $S_1$ remain available for analog transmission. It may be continued to attempt to select from these chunks a chunk with the largest variance, for example the chunk $S_2$, for digital encoding so as to determine whether the expected distortion for the analog transmission based on the remaining chunks is to be decreased.

If the expected distortion keeps dropping, the chunk $S_2$ may be encoded digitally as shown in FIG. 5C. Based on the transmission resource to be consumed by the digital transmission of the chunk $S_2$, it is determined to discard two chunks from the analog transmission. Which chunks are to be discarded may be determined from the chunks $S_3$ to $S_{13}$ and the residual components of the chunks $S_1$ and $S_2$ that are currently available for analog transmission. As shown, the two chunks $S_{11}$ and $S_{12}$ in the set of chunks 520 with the smallest variances may be discarded. Then, the remaining chunks available for analog transmission may be processed in a similar manner so as to determine which chunks in the remaining chunks can be encoded in a digital manner and which can be encoded in an analog manner.

Since the residual components are used for analog transmission and the variances of the coefficients in the residual components are dependent on the quantization step, it means that the quantization step used for digital encoding is a factor that affects the distortion of analog transmission. This can be understood by detailing Equation (11). Specifically, the average per-symbol energy $P_a$ in analog transmission may be determined based on the available transmission energy $E_a$ and the available transmission bandwidth $B_a$ (it is supposed that each symbol carries two coefficients) as $P_a = E_a/2B_a$. The relationship between the overall transmission bandwidth constraint B and the transmission energy constraint E is $E = 2P_s*B$, and $B = N*L/2$. Therefore, the average per-symbol energy $P_a$ for analog transmission may also be rewritten as follows:

$$P_a = \frac{E - E_d}{2B_a} = \frac{NLP_s - B_d P_d}{L(N - T)} = \frac{\left(NP_s - \frac{B_d}{L}P_d\right)}{N - T} \qquad (12)$$

where $P_d$ represents the average per-symbol energy for digital transmission. If a two-dimensional average per-symbol energy predetermined for a specific system is $2P_s$, the average per-symbol energy $P_d$ for digital transmission may be fixed to be equal to $2P_s$. In some other examples, if it is known that the channel quality is relatively poor (for example, with a lower SNR), $P_d$ may be set as a multiple of 2Ps. Therefore, it may be determined that $P_d = 2P_s*\beta$, where $\beta$ is an integer greater than or equal to 1.

Based on $P_a$ in Equation (12), the distortion $D_{hyb}(K)$ in Equation (11) may be rewritten as:

$$D_{hyb}(K) = \frac{N_0}{NP_s - \sum_{i=1}^{K} 2\beta P_s b_i / r} \left(\sum_{i=1}^{K} \frac{Q_i}{\sqrt{12}} + \sum_{i=K+1}^{N-T} \sigma_i\right)^2 + \sum_{i=N-T+1}^{N} \sigma_i^2 \qquad (13)$$

$$= \frac{N_0}{P_s} \times \frac{1}{N - \sum_{i=1}^{K} 2\beta b_i / r} \left(\sum_{i=1}^{K} \frac{Q_i}{\sqrt{12}} + \sum_{i=K+1}^{N-T} \sigma_i\right)^2 + \sum_{i=N-T+1}^{N} \sigma_i^2.$$

It can be seen that the quantization step $Q_i$ may also affect the distortion. In the example implementations discussed above, it is all assumed that the quantization step for quantizing a given chunk in the case of digital encoding is predetermined and thus the distortion for analog transmission may be determined based on this predetermined value. However, a fixed quantization step may not be able to provide low expected distortions for chunks of different frames. Therefore, in some example implementations, instead of setting a fixed quantization step, different quantization steps may be dynamically determined for the given chunks that are to be encoded digitally, so as to further reduce the expected distortion of the analog transmission.

Figure 6:
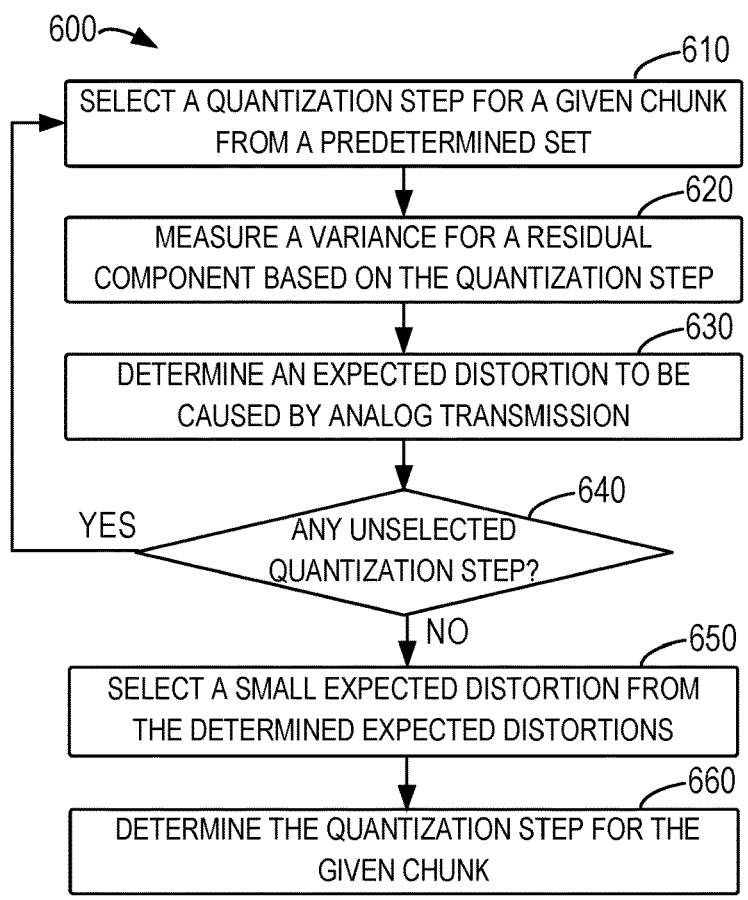
FIG. 6 illustrates a flowchart of a process of determining a quantization step in accordance with an implementation of the subject matter described herein.

FIG. 6 illustrates a flowchart of a process 600 of determining a quantization step in accordance with an implementation of the subject matter described herein. In some example implementations, the process 600 may be implemented when determining whether a given chunk in the set of chunks is suitable for digital encoding, for example, after 420 of the process 400. The process 600 may help reduce or minimize the expected distortion for current analog transmission by determining a corresponding quantization step for the current given chunk. In some example implementations, the process 600 may be performed by the controller 102 in the transmitting device 100 of FIG. 1. The determined quantization step may be provided to the encoder 104 for digital encoding.

At 610, a quantization step for a given chunk is selected from a predetermined set. In some example implementations, the predetermined set may include a plurality of discrete quantization steps available for digital encoding. As an example, the predetermined set may include quantization steps of $1/1024$, $1/512$, $1/256$, $1/128$, $1/64$, $1/32$, $1/16$, $1/8$, $1/4$, $1/2$, 1, 2, and the like. Of course, the predetermined set may include a larger or smaller number of values for the quantization steps. In some other example implementations, the predetermined set may indicate a range of quantization step for digital encoding. A different quantization step for a given chunk may be determined from that range each time with a certain interval.

At 620, a variance for a residual component of the given chunk is measured based on the selected quantization step. As mentioned above, the variance for the residual component is determined to be positively correlated with the current quantization step, and may be determined as $\sigma'^2_i = Q_i^2/12$ in an example. At 630, an expected distortion to be caused by analog transmission is determined. At this time, the given chunk is selected for digital transmission while the remaining chunks are assumed to be used for analog transmission. The current selected quantization step may be used in calculating the expected distortion of analog distortion.

At 640, it is determined whether the predetermined set of quantization steps has any quantization step unselected. If there is a quantization step(s) remained unselected, the process 600 may return to 610 to continue selecting a new quantization step to determine another expected distortion of analog transmission. By selecting some or all quantization steps in the predetermined set and determining the corresponding expected distortions, at 650, a small (or smallest) expected distortion is determined from the determined expected distortions. At 660, the quantization step that is corresponding to the expected distortion selected at 650 is determined as a quantization step for the current given chunk. Through the process 600, the quantization step that will cause a small expected distortion may be determined for a given chunk from the predetermined set of quantization steps.

In sum, the process of determining a quantization step for a given chunk is related to continuously updating the quantization step for the given chunk so as to keep reducing the expected distortion for analog transmission. A quantization step that results in a larger or largest reduction of the expected distortion may be determined as a desired quantization step for the given chunk. In some example implementations, the small expected distortion selected at 650 may be used as the current expected distortion of analog transmission, for example as the expected distortion determined at 430 of the process 400. In the case of selecting a new given chunk at 420 of the process 400, the process 600 may be run again to determine a quantization step for the current selected chunk. Through the processes 400 and 600, it can be determined not only which chunks among the chunks to be transmitted are determined for digital or analog encoding, but also which quantization steps cause small expected distortions of analog transmission and can be selected to digitally encode the chunks.

After processing the respective chunks is determined through the process 200, process 400, and/or process 600, the signal obtained by the digital encoding and/or analog encoding of the chunks may be transmitted to the receiving device 110 by the transmitter 106 in the transmitting device 100 via the channel 120. After receiving the signal, the receiver 112 of the receiving device 110 provides the signal to the decoder 114 for decoding. The decoding process includes inverse operations to the encoding process. In some example implementations, in order to facilitate the decoding operations, the transmitter 106 of the device 100 may also provide metadata related to the digital encoding and/or analog encoding to the receiving device 110 for decoding.

Such metadata may include the number (e.g., K) of the chunks encoded digitally or the number (e.g., M) of the chunks encoded in an analog manner among the transmitted chunks. Such information enables the scaling factors for analog decoding to be determined at the receiving device (e.g., through Equation (3)). Alternatively, the scaling factors for the chunks in analog encoding may be provided to the receiving device as the metadata. In some other example implementations, the metadata includes the quantization steps for the chunks in digital encoding. For example, the quantization steps determined for the chunks in the process 600 may be provided to the receiving device, such that the receiving device may perform inverse quantization operations on the received chunks that are digitally encoded using the corresponding quantization steps.

In the example implementations of discarding some chunks due to the resource constraint, the number of the discarded chunks may be provided to the receiving device as the metadata. Based on such metadata, the receiving device may determine, upon decoding, which signal in the received signal derived from the analog encoding is corresponding to the residual components of the chunks in the digital encoding, so that some signals from the analog decoding may be combined with the corresponding signals from the digital decoding to obtain the decoded chunks.

Example Implementations of the Decoding Process

Figure 7:
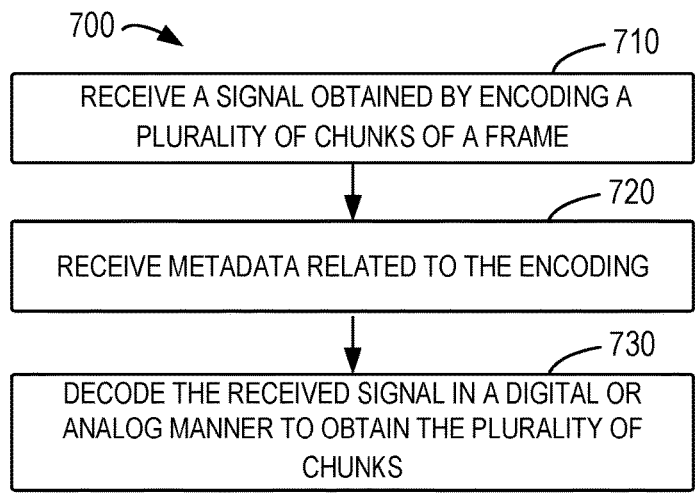
FIG. 7 illustrates a flowchart of a decoding process in accordance with an implementation of the subject matter described herein.

FIG. 7 illustrates a flowchart of a decoding process 700 in accordance with an implementation of the subject matter described herein. The process 700 may be performed by the receiving device 110 of FIG. 1. At 710, the receiver 112 of the receiving device 110 receives a signal obtained by encoding a plurality of chunks of a frame. Dependent on the operations at the encoding side, the received signal may include an analog signal and/or a digital signal corresponding to the chunks encoded in an analog manner and/or a digital manner, respectively. At 720, the receiver 112 of the receiving device 110 further receives metadata related to the encoding. As discussed above, the received metadata may include information related to the encoding operations at the encoding side so as to facilitate the decoding of the signal.

At 730, the decoder 114 of the receiving device 110 decodes the received signal in a digital or analog manner so as to obtain the plurality of chunks. The received digital signal may be decoded in a digital manner while the received analog signal may be decoded an analog manner. The decoding operations are inverse operations to the encoding operations.

Specifically, for digital decoding, the digital signal may be demodulated and decoded channel using a channel decoding and demodulation scheme corresponding to the channel encoding and modulation scheme. For example, if QPSK modulation and a ½ rate of convolution encoding are used at the encoding side, the corresponding QPSK demodulation and the corresponding convolution decoding may be applied on the received digital signal. Then, corresponding to the quantization of the chunks in the digital encoding, an inverse quantization may be applied on the demodulated digital signal using the quantization steps. For analog decoding, the received analog signal may be demodulated. The demodulation scheme may be an inverse process of the modulation scheme at the encoding side. For example, if an amplitude modulation is used at the encoding side, the corresponding amplitude demodulation may be applied at the decoding side. However, the demodulated signal may be decoded with the corresponding scaling factors (e.g., as described in the above Equation (4)).

The hybrid digital-analog encoding of chunks and the corresponding decoding process has been discussed above. In accordance with the implementations of the subject matter described herein, through the hybrid scheme, it is able to achieve a higher bit capacity in digital encoding as well as graceful performance transitions in analog encoding with respect to the channel variations. In addition, under the constraint of given transmission resource, the distortion introduced in analog transmission is maintained at a low level by appropriately allocating the chunks for digital encoding and analog encoding and allocating the transmission resource for digital transmission and analog transmission.

Example Implementations of Devices

Figure 8:
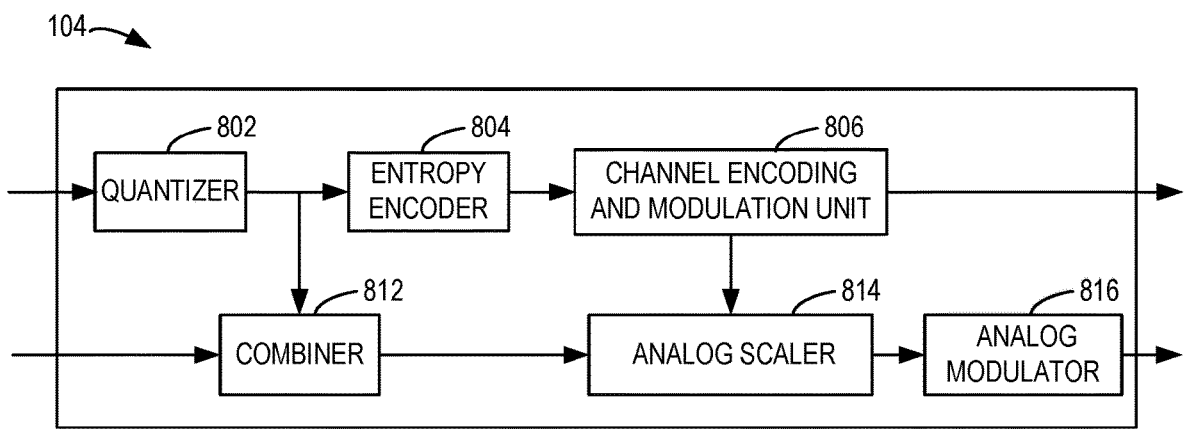
FIG. 8 illustrates a block diagram of an encoder in a transmitting device of FIG. 1 in accordance with an implementation of the subject matter described herein.
Figure 9:
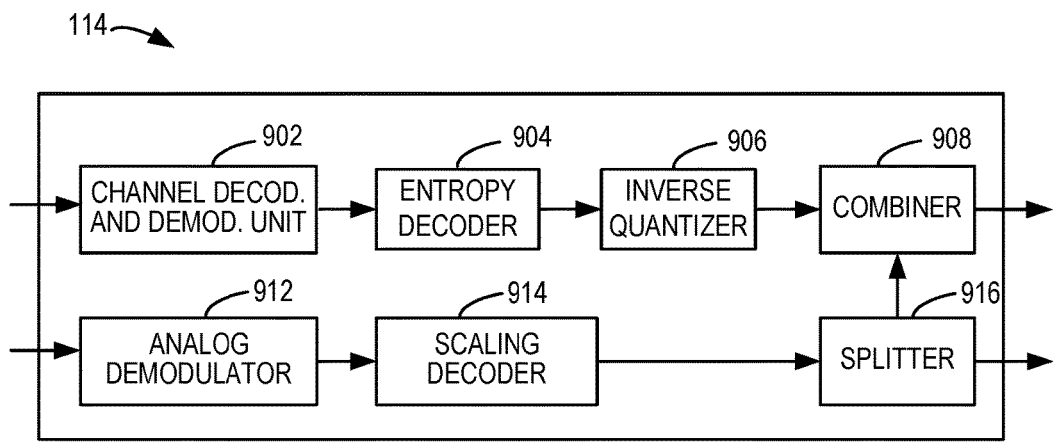
FIG. 9 illustrates a block diagram of a decoder in a receiving device of FIG. 1 in accordance with an implementation of the subject matter described herein.

FIGS. 8 and 9 illustrate block diagrams of an example encoder and decoder in accordance with implementations of the subject matter described herein. The encoder in FIG. 8 may be implemented as the encoder 104 in the transmitting device 100 of FIG. 1. The encoder 104 may include a digital encoding portion and an analog encoding portion. As shown, the digital encoding portion includes a quantizer 802, an entropy encoder 804, and a channel encoding and modulation unit 806. The analog encoding portion includes a combiner 812, an analog scaler 814, and an analog modulator 816.

The chunk(s) determined by the controller 102 for digital encoding may be provided to the quantizer 802. In some example implementations, the controller 102 may also provide quantization steps determined for the current chunks to the quantizer 802. In other example implementations, the quantizer 802 may be configured with a fixed quantization step. After receiving the chunks, the quantizer 802 may quantize the chunks with the quantization step(s), for example, by using the scalar quantization as described in Equations (7)-(9), to obtain primary components and residual components. The primary components are provided to the entropy encoder 804 for digital encoding. The channel encoding and modulation is applied on the encoded signal by the channel encoding and modulation unit 806 to generate a corresponding digital signal for transmission over a channel.

The chunk(s) determined by the controller for analog encoding may be provided to the combiner 812. In the example implementations where the residual components of the chunks in digital encoding are also used for analog transmission, the combiner 812 also receives the residual components from the quantizer 802 and encodes the residual components together with the chunks for analog encoding. It would be appreciated that in examples that the residual components are not used for analog transmission, the combiner 812 may be omitted. The analog scaler 814 determines the transmission resource available for analog transmission based on the information on the channel encoding and modulation in the digital encoding portion for example through the above Equations (1) and (2). The analog scaler 814 then determines the scaling factors for the chunks (including the residual components) in the analog transmission, for example through the above Equation (3). The determined scaling factors may be used to scale coefficients of the chunks. The scaled chunks are provided to the analog modulator 816 for modulation so as to generate a corresponding analog signal for transmission over the channel. The modulator 816 may apply amplitude modulation or other suitable modulation techniques.

The decoder in FIG. 9 may be implemented as the decoder 114 in the receiving device 110 of FIG. 1. The decoder 114 includes a digital decoding portion and a analog decoding portion. As shown, the digital decoding portion includes a channel decoding and demodulation unit 902, an entropy decoder 904, an inverse quantizer 906, and a combiner 908. The analog decoding portion includes an analog demodulator 912, a scaling decoder 914, and a splitter 916.

Upon reception of the digital signal, the channel decoding and demodulation unit 902 processes the digital signal with a decoding and demodulation scheme corresponding to the scheme applied by the channel encoding and modulation unit 806. The processed signal is decoded by the entropy decoder 904 and then is applied with inverse quantization by the inverse quantizer 906. The inverse quantization process may be based on the quantization step used by the quantizer 804 at the encoding side. In example implementations where residual components of the chunks obtained in the digital encoding are used for analog transmission, the combiner 908 may also receive the decoded residual components of the chunks from the analog decoding portion, and combine the chunks after the inverse quantization (corresponding to the primary components of the chunks) with the residual components so as to obtain the corresponding chunks.

Upon reception of the analog signal, the analog modulator 912 applies a demodulation scheme corresponding to the modulation scheme at the encoding side on the received analog signal. The demodulated signals are scaled by the scaling decoder 914 with the scaling factors to decode the corresponding chunks or residual components. The scaling factors may be determined from the received metadata. The scaled signal is split by the splitter 916 into a portion corresponding to the residual components and a portion corresponding to the whole chunks. The splitter 916 provides the decoded residual components to the combiner 908 of the digital decoding portion. It would be appreciated that if the residual components are not used for analog transmission, the received analog signal may only include a signal encoded from the chunks. Therefore, the combiner 908 may be omitted.

Performances and Effects

Figure 10A:
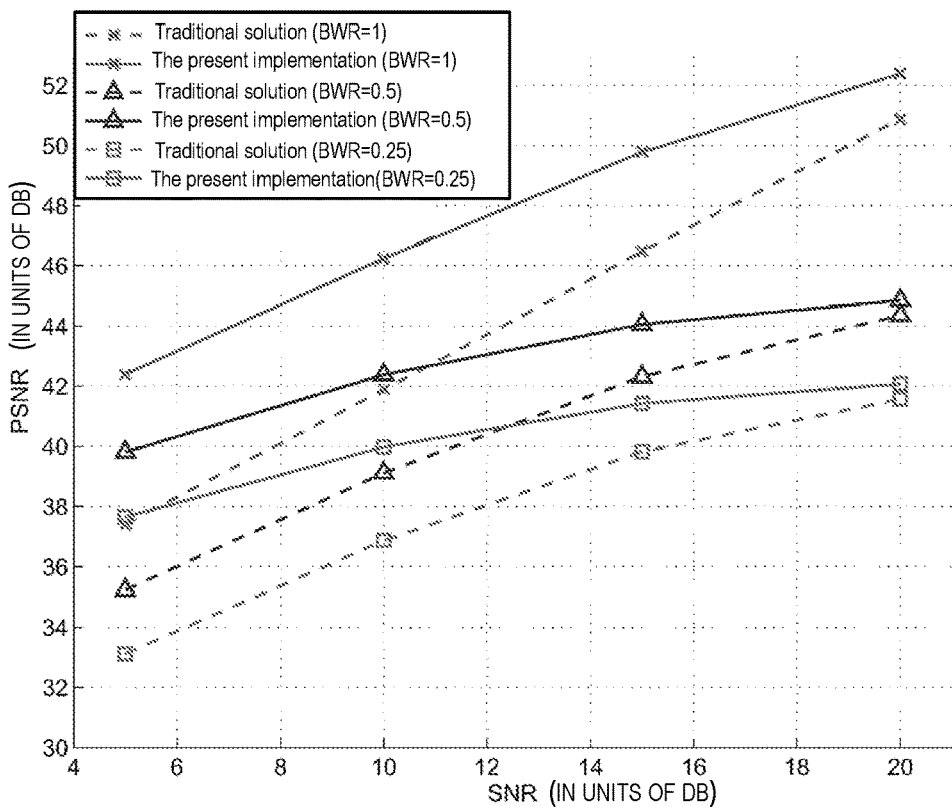
FIGS. 10A and 10B illustrate diagrams of performance comparison between an example implementation of the subject matter described herein and a traditional solution.
Figure 10B:
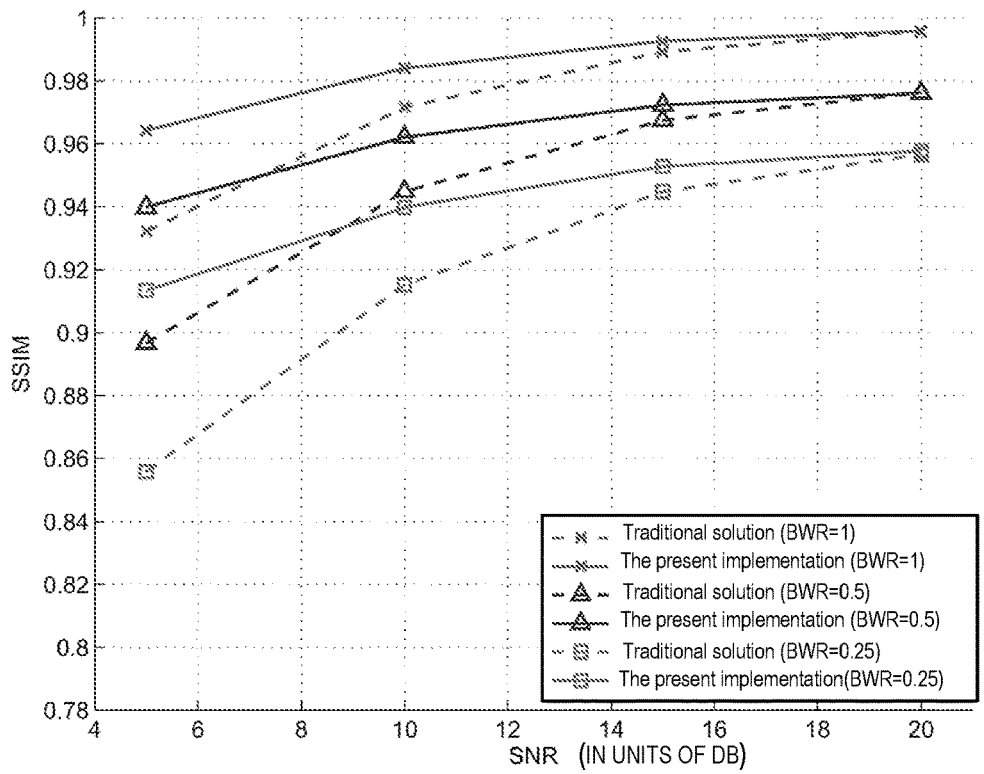

FIGS. 10A and 10B illustrate diagrams of performance comparison between an example implementation of the subject matter described herein and a traditional solution with settings of different bandwidth ratios (BWR). The traditional solution for comparison is a scheme based on total analog transmission. In FIGS. 10A and 10B, the performances of the two solutions are measured with the PSNR (peak signal to noise ratio) and SSIM (structural similarity measure), respectively, where PSNR is in units of dB and the value range of SSIM is from 0 to 1. It can be seen that for each bandwidth ratio setting, the example implementation of the subject matter described herein can achieve a higher performance under a certain channel quality (SNR). In other words, the hybrid digital-analog transmission described herein not only can be better adapted to the channel variations as the total analog transmission, but also can achieve performance improvements in aspects such as PSNR and SSIM.

Figure 11A:
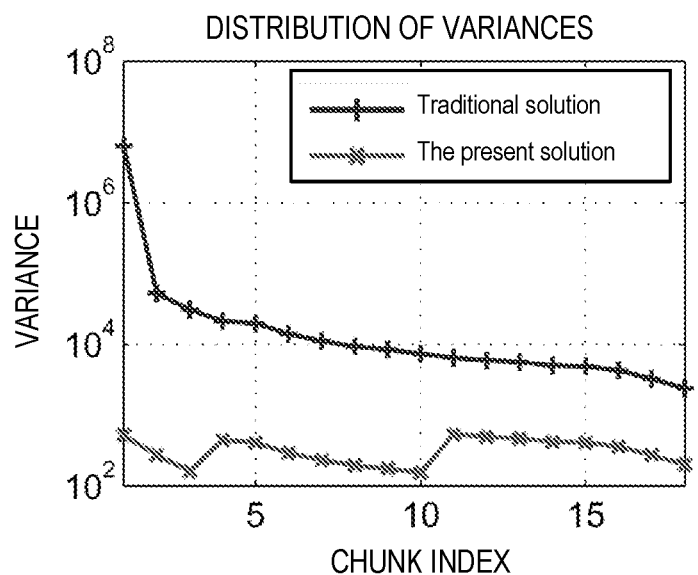
FIGS. 11A and 11B illustrate diagrams of comparison of various different factors between an example implementation of the subject matter described herein and a traditional solution.
Figure 11B:
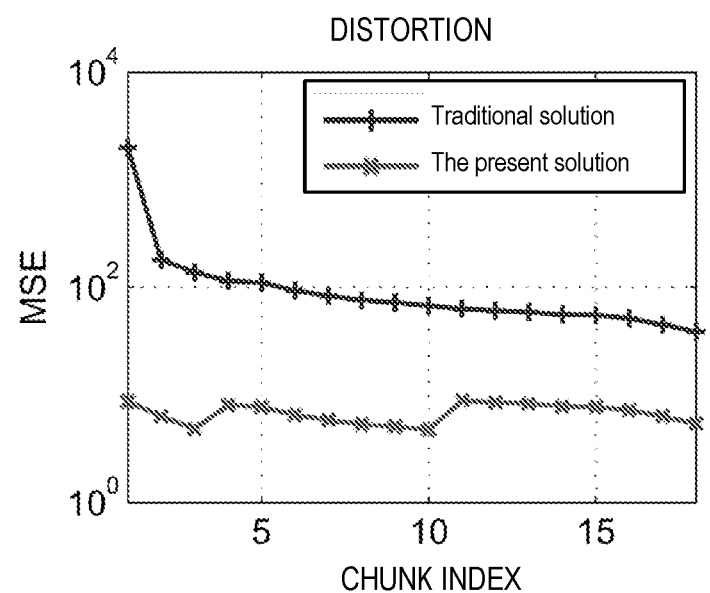

FIGS. 11A-11B illustrate diagrams of comparison of various different factors between an example implementation of the subject matter described herein and a traditional solution. In the examples of the figures, there are more than 15 chunks to be transmitted and only the first 15 chunks with the highest variances are shown. In accordance with an example implementation of the subject matter described herein, because of their relatively high variances, the 15 chunks may be selected for digital encoding. In FIG. 11A, a comparison between the example implementation of the subject matter described herein and the tradition solution in the aspect of variances for the chunks in analog transmission. In the example implementation described herein, since the first 15 chunks are used for digital encoding, only their residual components are used for analog transmission. However, in the traditional solution, the whole chunks are used for analog transmission. It can be seen that due to the quantization, in the example implementation provided herein, the variances of the residual components in the analog transmission are far smaller than the variances of the chunks that are completely used in analog transmission. Therefore, the example implementation of the subject matter described herein can achieve a smaller distortion, which can be seen from FIG. 11B. As an example, the distortion is measured by a mean square error (MSE).

Figure 12A:
FIGS. 12A-12C illustrate a comparison of visual quality between an example implementation of the subject matter described herein and a traditional solution after encoding an example image.
Figure 12B:
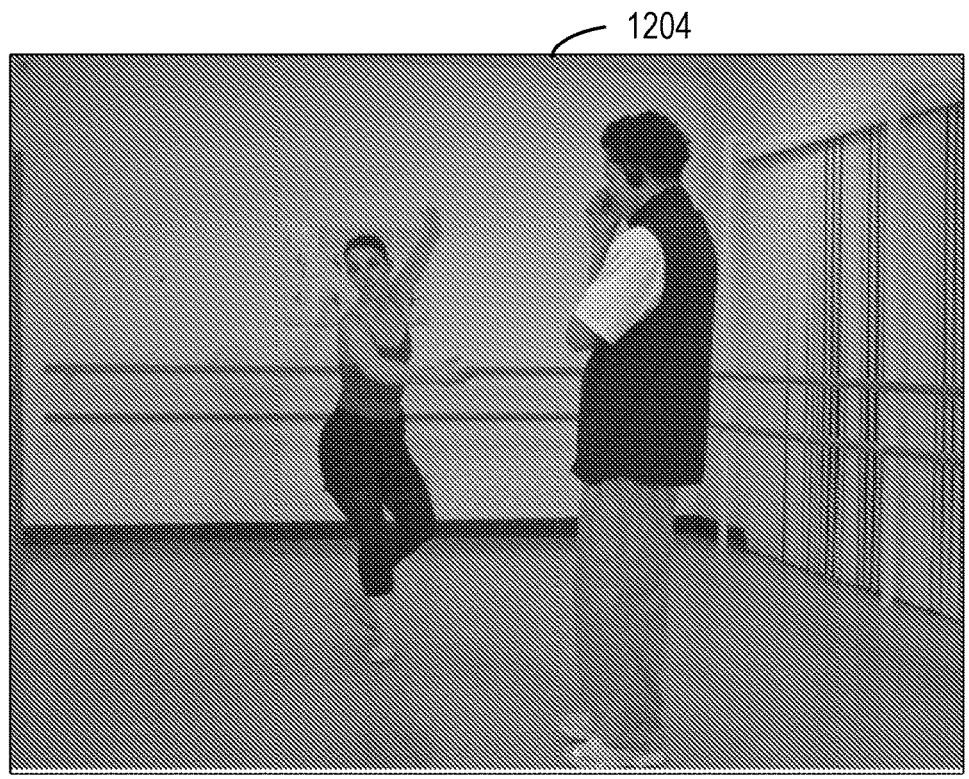
Figure 12C:
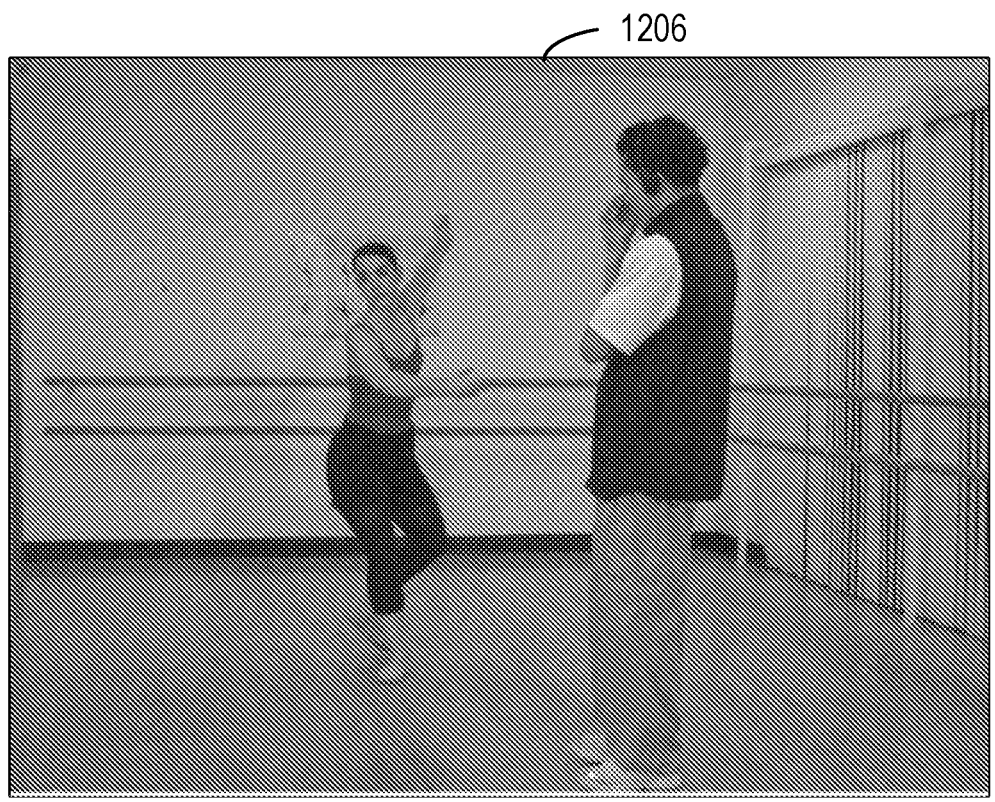

FIGS. 12A-12C illustrate a comparison of visual quality between an example implementation of the subject matter described herein and a traditional solution after encoding an example image. The image 1202 shown in FIG. 12A is an original image. The image 1204 shown in FIG. 12B is an image obtained after decoding at the receiving side by applying the hybrid coding solution of an example implementation of the subject matter described herein to the image 1202. The image shown in FIG. 12C is an image obtained after decoding at the receiving side by applying a complete analog coding to the image 102. It can be seen that compared with the image 1206, the image 1204 is similar to the original image 1202 with a higher quality and a smaller distortion.

Example Implementations

In one aspect, a device is provided in the subject matter described herein. The apparatus comprises: a controller configured to obtain a plurality of chunks of a frame to be transmitted over a channel, the plurality of chunks being represented by coefficients obtained by applying a transformation on the frame, and determine an expected distortion to be caused by analog transmission on the channel based on a transmission resource constraint of the channel and variances of the coefficients in the respective chunks; and an encoder configured to selectively encode the plurality of chunks for digital or analog transmission on the channel based on the expected distortion for the plurality of chunks.

In some implementations, the controller is configured to: determine, from the plurality of chunks, a set of chunks for analog transmission, and determine whether the expected distortion to be caused by the analog transmission is to be decreased if a given chunk in the set of chunks is digitally encoded.

In some implementations, the encoder is configured to, in response to determining that the expected distortion is to be decreased, digitally encode the given chunk for digital transmission.

In some implementations, the encoder is configured to, in response to determining that the expected distortion is to remain unchanged or to be increased, apply analog encoding on chunks in the set of chunks for analog transmission.

In some implementations, the controller is further configured to: select the given chunk from the set of chunks based on the variances of the coefficients, the variance of the coefficients in the given chunk being greater than the variance of the coefficients in at least one of remaining chunks in the set of chunks.

In some implementations, the controller is configured to determine the expected distortion by: measuring a transmission resource to be consumed by the digital transmission based at least on the variance for the given chunk; determining an available transmission resource for the analog transmission based on the transmission resource constraint and the transmission resource to be consumed by the digital transmission; and determining the expected distortion based on the available transmission resource and the variances of the coefficients in remaining chunks in the set of chunks.

In some implementations, the encoder is configured to digitally encode the given chunk by: quantizing, with a quantization step, the given chunk into a primary component and a residual component; and digitally encode the primary component of the given chunk.

In some implementations, the encoder is further configured to apply analog encoding on the residual component of the given chunk for the analog transmission. In some implementations, the controller is configured to further determine the expected distortion by determining a variance of coefficients representing the residual component based on the quantization step, and determining the expected distortion further based on the variance of the coefficients representing the residual component.

In some implementations, the controller is further configured to determine the quantization step for the given chunk by determining an initial quantization step for the given chunk; measuring an initial variance of the coefficients representing the residual component of the given chunk based on the initial quantization step; determining an initial expected distortion to be caused by the analog transmission based at least on the initial variance; and determining the quantization step for the given chunk by updating the initial quantization step so as to decrease the initial expected distortion.

In some implementations, the controller is further configured to: measure a transmission resource to be consumed by the digital transmission based at least on the variance for the given chunk, determine the number of chunks to be discarded based on the transmission resource to be consumed by the digital transmission, and discard the determined number of chunks from the set of chunks. In some implementations, the controller is configured to determine the expected distortion based on the transmission resource constraint and the variances of the coefficients in the chunks remaining in the set of chunks.

In some implementations, the controller is configured to discard the determined number of chunks from the set of chunks based on the variances for the chunks available for the analog transmission, the variances of the coefficients in the discarded chunks being smaller than a variance of coefficients in at least one of the remaining chunks in the set of chunks.

In some implementations, the device further comprises: a transmitter configured to transmit, over the channel, a signal obtained by encoding the plurality of chunks.

In another aspect, a method is provided in the subject matter described herein. The method comprises: obtaining a plurality of chunks of a frame to be transmitted over a channel, the plurality of chunks being represented by coefficients obtained by applying a transformation on the frame; determining an expected distortion to be caused by analog transmission on the channel based on a transmission resource constraint of the channel and variances of the coefficients in the respective chunks; and selectively encoding the plurality of chunks for digital or analog transmission on the channel based on the expected distortion for the plurality of chunks.

In some implementations, the method further comprises: determining, from the plurality of chunks, a set of chunks for analog transmission; and determining whether the expected distortion to be caused by the analog transmission is to be decreased if a given chunk in the set of chunks is digitally encoded. Encoding the plurality of chunks comprises: in response to determining that the expected distortion is to be decreased, digitally encoding the given chunk for digital transmission.

In some implementations, encoding the plurality of chunks further comprises, in response to determining that the expected distortion is to remain unchanged or to be increased, apply analog encoding on chunks in the set of chunks for analog transmission.

In some implementations, the method further comprises: selecting the given chunk from the set of chunks based on the variances of the coefficients, the variance of the coefficients in the given chunk being greater than the variance of the coefficients in at least one of remaining chunks in the set of chunks.

In some implementations, determining the expected distortion comprises: measuring a transmission resource to be consumed by the digital transmission based at least on the variance for the given chunk; determining an available transmission resource for the analog transmission based on the transmission resource constraint and the transmission resource to be consumed by the digital transmission; and determining the expected distortion based on the available transmission resource and the variances of coefficients in remaining chunks in the set of chunks.

In some implementations, encoding the plurality of chunks comprises: quantizing, with a quantization step, the given chunk into a primary component and a residual component; and digitally encoding on the primary component of the given chunk.

In some implementations, encoding the plurality of chunks further comprises applying analog encoding on the residual component of the given chunk for the analog transmission. In some implementations, determining the expected distortion comprises: determining a variance of coefficients representing the residual component based on the quantization step, and determining the expected distortion further based on the variance of the coefficients representing the residual component.

In some implementations, the method further comprises determining the quantization step of the given chunk by: determining an initial quantization step for the given chunk; measuring an initial variance of the coefficients representing the residual components of the given chunk based on the initial quantization step; determining an initial expected distortion to be caused by the analog transmission based at least on the initial variance; and determining the quantization step for the given chunk by updating the initial quantization step so as to decrease the initial expected distortion.

In some implementations, determining the expected distortion further comprises: measuring a transmission resource to be consumed by the digital transmission based at least on the variance for the given chunk, determining the number of chunks to be discarded based on the transmission resource to be consumed by the digital transmission, discarding the determined number of chunks from the set of chunks, and determining the expected distortion based on the transmission resource constraint and the variances of the coefficients in the chunks remaining in the set of chunks.

In some implementations, discarding the determined number of chunks comprises: discarding the determined number of chunks from the set of chunks based on the variances for the chunks available for the analog transmission, the variances of the coefficients in the discarded chunks being smaller than a variance of coefficients in at least one of the remaining chunks in the set of chunks.

In some implementations, the method further comprises: transmitting, over the channel, a signal obtained by encoding the plurality of chunks.

In a further aspect, a device is provided in the subject matter described herein. The device comprises a receiver configured to receive, over a channel, a signal encoded from a plurality of chunks of a frame, the plurality of chunks being represented by coefficients obtained by applying a transformation on the frame and being selectively encoded in a digital or analog manner based on an expected distortion of analog transmission, the expected distortion of the analog transmission being determined based on a transmission resource constraint of the channel and variances of the coefficients in the respective chunks; and a decoder configured to decode the signal to obtain the plurality of chunks of the frame.

The functionally described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A device comprising:
at least one processor; and
memory including instructions that, when executed by the at least one processor, cause the device to perform operations to:
obtain a plurality of chunks of a frame to be transmitted over a channel, the plurality of chunks being represented by coefficients obtained by applying a transformation on the frame;
determine, from the plurality of chunks, a set of chunks for analog transmission;
calculate an expected distortion for analog transmission on the channel based on a transmission resource constraint of the channel and variances of the coefficients in respective chunks of the plurality of chunks;
calculate whether the expected distortion calculated for the analog transmission will be decreased by digitally encoding a given chunk of the set of chunks; and
selectively encode a first subset of chunks of the set of chunks for analog transmission for digital transmission on the channel based on the expected distortion for members of the first subset of chunks, wherein the first subset of chunks are encoded for digital transmission in response to an expected decrease in distortion for the members, wherein a second subset of chunks of the set of chunks is encoded for analog transmission, and wherein the second subset of chunks are encoded for analog transmission based on a lack of an expected decrease in distortion of the members of the second subset.

2. The device of claim 1, the memory further comprising instructions that cause the device to, in response to determining that the expected distortion is to remain unchanged or to be increased, apply analog encoding on chunks in the set of chunks for analog transmission.

3. The device of claim 1, the memory further comprising instructions that cause the device to:
select the given chunk from the set of chunks based on the variances of the coefficients, a variance of the coefficients in the given chunk being greater than a variance of the coefficients in at least one of remaining chunks in the set of chunks.

4. The device of claim 1, wherein the instructions to determine the expected distortion include instructions to:
measure a transmission resource to be consumed by the digital transmission based at least on a variance for the given chunk;
determine an available transmission resource for the analog transmission based on the transmission resource constraint and the transmission resource to be consumed by the digital transmission; and
determine the expected distortion based on the available transmission resource and the variances of the coefficients in remaining chunks in the set of chunks.

5. The device of claim 1, wherein the instructions to digitally encode the given chunk include instructions to:
quantize, with a quantization step, the given chunk into a primary component and a residual component; and
digitally encode the primary component of the given chunk.

6. The device of claim 5, the memory further comprising instructions that cause the device to apply analog encoding on the residual component of the given chunk for the analog transmission; and
wherein the instructions to determine the expected distortion include instructions to:
determine a variance of coefficients representing the residual component based on the quantization step, and
determine the expected distortion further based on the variance of the coefficients representing the residual component.

7. The device of claim 6, wherein the instructions to determine the quantization step for the given chunk include instructions to:
determine an initial quantization step for the given chunk;
measure an initial variance of the coefficients representing the residual component of the given chunk based on the initial quantization step;
calculate an initial expected distortion for the analog transmission based at least on the initial variance; and
determine the quantization step for the given chunk by updating the initial quantization step so as to decrease the initial expected distortion.

8. The device of claim 1, the memory further comprising instructions that cause the device to:
measure a transmission resource to be consumed by the digital transmission based at least on the variance for the given chunk;
determine the number of chunks to be discarded based on the transmission resource to be consumed by the digital transmission; and
discard the determined number of chunks from the set of chunks, and
wherein the expected distortion is determined based on the transmission resource constraint and the variances of the coefficients in the chunks remaining in the set of chunks.

9. The device of claim 8, the memory further comprising instructions that cause the device to discard the determined number of chunks from the set of chunks based on the variances for the chunks available for the analog transmission, the variances of the coefficients in the discarded chunks being smaller than a variance of coefficients in at least one of the remaining chunks in the set of chunks.

10. A method comprising:
obtaining a plurality of chunks of a frame to be transmitted over a channel, the plurality of chunks being represented by coefficients obtained by applying a transformation on the frame;
determining, from the plurality of chunks, a set of chunks for analog transmission;
calculating an expected distortion for analog transmission on the channel based on a transmission resource constraint of the channel and variances of the coefficients in respective chunks of the plurality of chunks; and
selectively encoding a first subset of chunks of the set of chunks for analog transmission for digital transmission on the channel based on the expected distortion for members of the first subset of chunks, wherein the first subset of chunks are encoded for digital transmission in response to an expected decrease in distortion for the members, wherein a second subset of chunks of the set of chunks is encoded for analog transmission, and wherein the second subset of chunks are encoded for analog transmission based on a lack of an expected decrease in distortion of the members of the second subset.

11. The method of claim 10, wherein encoding the plurality of chunks further comprises:
in response to determining that the expected distortion is to remain unchanged or to be increased, applying analog encoding on chunks in the set of chunks for analog transmission.

12. The method of claim 10, further comprising:
selecting a given chunk from the set of chunks based on the variances of the coefficients, the variance of the coefficients in the given chunk being greater than the variance of the coefficients in at least one of remaining chunks in the set of chunks.

13. A device comprising:
at least one processor; and
memory including instructions that, when executed by the at least one processor, cause the at least one processor to perform operations to:
receive, over a channel, a signal encoded from a plurality of chunks of a frame, the plurality of chunks being represented by coefficients obtained by applying a transformation on the frame and being selectively encoded in a digital or analog manner based on an expected distortion of analog transmission, the expected distortion of the analog transmission being determined based on a transmission resource constraint of the channel and variances of the coefficients in the respective chunks;
determine, from the plurality of chunks, a set of chunks for analog transmission, wherein selectively encoding the plurality of chunks includes selectively encoding a first subset of chunks of the set of chunks for analog transmission for digital transmission on the channel based on the expected distortion for members of the first subset of chunks, wherein the first subset of chunks are encoded for digital transmission in response to an expected decrease in distortion for the members, wherein a second subset of chunks of the set of chunks is encoded for analog transmission, and wherein the second subset of chunks are encoded for analog transmission based on a lack of an expected decrease in distortion of the members of the second subset; and
decode the signal to obtain the plurality of chunks of the frame.

* * * * *